United States Patent [19]

Takeuchi et al.

[11] 3,917,358

[45] Nov. 4, 1975

[54] CONTROL DEVICE FOR AN AUTOMOTIVE BRAKE SYSTEM

[75] Inventors: Yasuhisa Takeuchi; Haruhiko Iizuka, both of Yokosuka, Japan

[73] Assignee: Nissan Motor Company Limited, Yokohama, Japan

[22] Filed: July 9, 1974

[21] Appl. No.: 486,852

[30] Foreign Application Priority Data

July 11, 1973 Japan.............................. 48-78038

[52] U.S. Cl.............. 303/21 BE; 188/181 C; 303/20
[51] Int. Cl.².......................................... B60T 8/08
[58] Field of Search ............... 188/181; 303/20, 21; 307/10 R; 317/5; 324/161–162; 340/53, 62, 262–263

[56] References Cited

UNITED STATES PATENTS 3,612,622   10/1971   Riordan............................. 303/21 P
3,804,470   4/1974    Slavin et al. .................... 303/21 BE Primary Examiner—Trygve M. Blix
Assistant Examiner—Stephen G. Kunin

[57] ABSTRACT

A brake pressure control device for a hydraulically controlled brake system of a vehicle, which controls the brake pressure modulator by using a signal analogous to the wheel speed signal but varying earlier than the wheel signal so as to compensate a time delay involved in the operation of the brake actuator unit.

3 Claims, 9 Drawing Figures

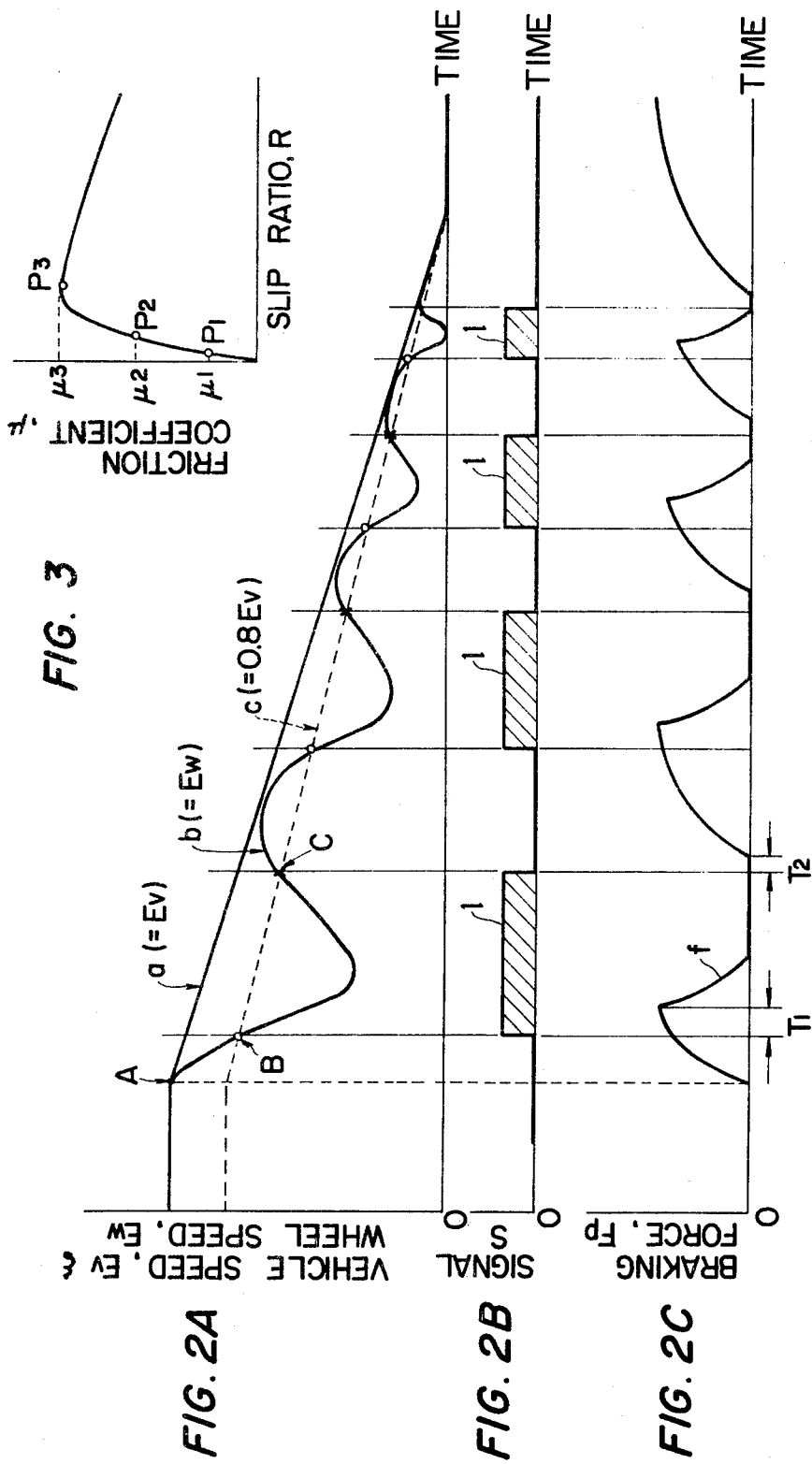

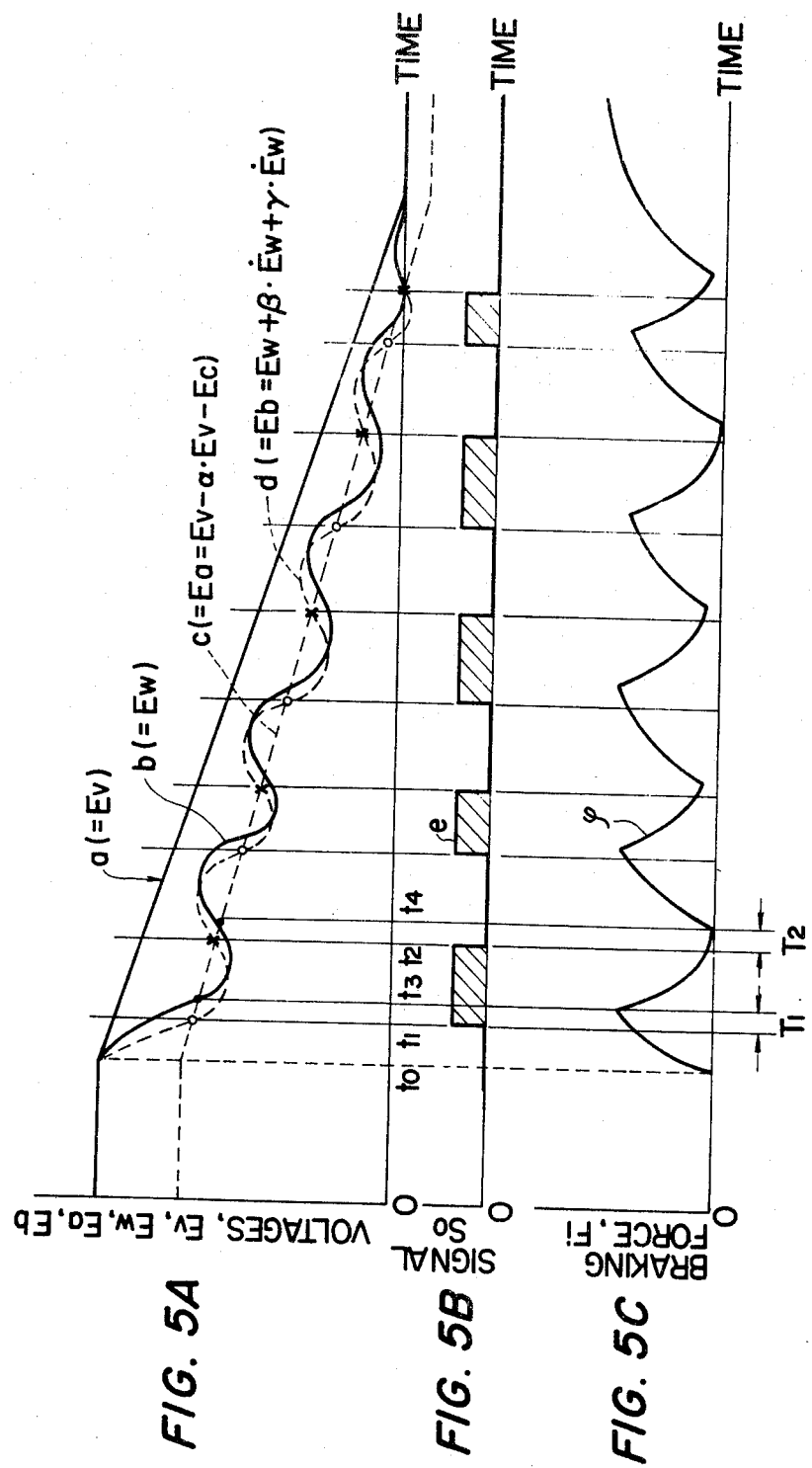

CONTROL DEVICE FOR AN AUTOMOTIVE BRAKE SYSTEM

The present invention relates to a control device for a brake system of an automotive vehicle and, more particularly, to an electric control device for use in an automotive brake system having a skid control arrangement.

The skid control arrangement of an automotive brake system is effective to prevent skidding of road wheels and to minimize a stopping distance of a vehicle during braking so that the vehicle braked upon is rapidly and safely brought to a stop while allowing the driver of the vehicle to maintain directional control over the vehicle even when the vehicle is decelerated on an icy or otherwise slippery road surface.

One useful measure to determine a degree of slippage of a road wheel of an automotive vehicle on a road surface is a ratio R which is given by $$R = (Vv - Vw)/Vv,$$

where $Vv$ is a vehicle speed and $Vw$ is a circumferential speed of rotation of a road wheel of the vehicle. It is, in this instance, well known in the art of automotive brakes that the brake system should be so arranged as to maintain the slip ratio R within a range of from about 0.15 to about 0.25 for the purpose of applying brakes on the road wheel efficiently and in a stable condition. It will be, thus, most preferable if the skid control device of an automotive brake system is designed to maintain the slip ratio of the vehicle within this range even when skid is about to take place. Actually, however, this can not have been realized because of a substantial amount of delay time involved in a hydraulic actuator unit which is usually incorporated into the brake system for actuating a mechanical brake device (such as a brake drum and shoes in a drum type brake device or friction pads or shoes in a disc type brake device) associated with a road wheel or an axle of the wheel of the vehicle. Eliminating or at least minimizing such a delay time could be accomplished through use of highly sophisticated control means tailored to compensate for the delay time but has not been attempted on a practical basis because of the extremely increased production cost required of the control means.

It is, therefore, an object of the present invention to provide an improved automotive brake control device which is capable of accurately regulating a braking force on a road wheel when an impending skid condition is detected during braking.

It is another object of the present invention to provide an improved automotive brake control device which is adapted to maintain a slip ratio of a vehicle within a predetermined range prescribed to achieve efficient and stabilized braking performances.

It is still another object of the invention to provide an improved automotive brake control device which is operative to compensate for a delay time involved in the operation of an actuator unit incorporated into the brake system.

It is still another object of the invention to provide an improved automotive brake control device which is reliable in operation and which is economical to manufacture.

Yet, it is another object of the present invention to provide an improved automotive brake control device adapted to prevent skidding of a road wheel of an automotive vehicle and to minimize a stopping distance of the vehicle during braking.

In accordance with the present invention, these and other objects will be accomplished in an electric control device which comprises a vehicle speed sensor for detecting a speed of an automotive vehicle and producing an output voltage proportional to the detected vehicle speed, a wheel speed sensor for detecting a circumferential speed of rotation of a road wheel of the vehicle and producing an output voltage which is proportional to the detected wheel speed, first computing means for subtracting from the output voltage of the vehicle speed sensor a first variable reference voltage related to the output voltage of the vehicle speed sensor, first differentiating means for differentiating the output voltage of the wheel speed sensor with respect to time and producing an output voltage proportional to a rate of increase of the output voltage of the wheel speed sensor, second differentiating means for differentiating the output voltage of the wheel speed sensor with respect to time and producing an output voltage proportional to a rate of decrease of the output voltage of the wheel speed sensor, second computing means for adding to an output signal of the wheel speed sensor a second variable reference voltage proportional to the output voltage from the first differentiator and subtracting from the output voltage of the wheel speed sensor a third variable reference voltage proportional to the output voltage from the second differentiation means, and comparing means for comparing the output voltages from the first and second computing means with each other and producing a digital signal when the output voltage from the first computing means is higher than the output voltage from the second computing means whereby a braking force applied to the road wheel is lessened in response to the digital signal.

The objects and features of the electric brake control device according to the present invention will be more clearly understood from the following description taken in conjunction with the accompanying drawings, in which:

FIG. 2A is a diagram which illustrates waveforms of voltages representative of vehicle and wheel speeds detected during braking on a road wheel of an automotive vehicle quipped with the prior art brake control device illustrated in FIG. 1;

FIG. 2B is a diagram which illustrates a waveform of an output signal produced by the electric brake control device shown in FIG. 1 in response to the voltages having the waveforms shown in FIG. 2A;

FIG. 2C is a diagram which illustrates a waveform of the braking force variations produced by the actuator shown in FIG. 1 in response to the signal waveform shown in FIG. 2B;

FIG. 3 is a graph which shows a curve indicating a relation between a slip ratio and a coefficient of frinction between a tire of a vehicle road wheel and a road surface during braking;

FIG. 5A is a diagram which shows waveforms of voltages appearing or computed in the brake control device illustrated in FIG. 4;

FIG. 5B is a diagram which illustrates a waveform of a digital control signal produced in the brake control device shown in FIG. 4; and FIG. 5C is a diagram showing a curve which is indicative of a braking force applied to a road wheel of an automotive vehicle by means of the control signal illustrated in FIG. 5B.

Figure 1:
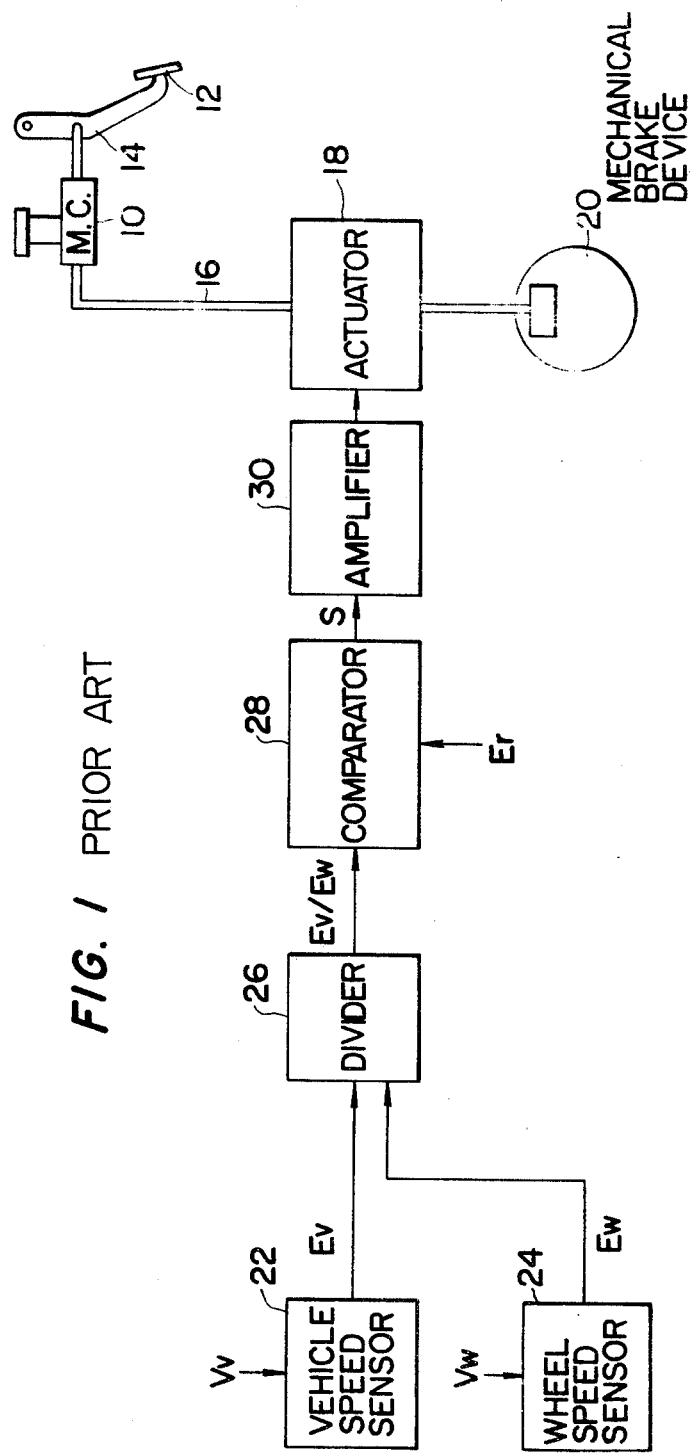
FIG. 1 is a block diagram which illustrates an example of a prior art electric control device for an automotive brake system.

Reference will now be made to the drawings, first to FIG. 1 which illustrates an example of an existing electric brake control device which is intended to maintain the slip ratio of a road wheel within the previously mentioned range of from about 0.15 to about 0.25. The brake control is incorporated into a hydraulic brake system which is shown to comprise a master cylinder 10 which is adapted to deliver a braking fluid pressure when a brake pedal 12 operatively connected to the piston (not shown) of the master cylinder 10 through a mechanical linkage is depressed by a vehicle driver. The braking fluid pressure thus developed in the master cylinder 10 is passed through a braking fluid line 16 to a hydraulic actuator unit 18 which is assumed to include, though not shown, suitable skid control valve means and a wheel cylinder to actuate a mechanical brake device 20 associated with each of road wheels of the vehicle. The mechanical brake device 20 may be of the drum type or the disc type which is well known in the art. The electric brake control device to which the present invention is directed is arranged to electrically control the hydraulic actuator unit 18 when an impending skid is detected by the control device. When, thus, the brake pedal 12 is depressed by the vehicle driver, the braking fluid pressure developed in the master cylinder 10 is directed into the hydraulic actuator unit 18 so that a braking force proportional to the supplied fluid pressure is applied to the road wheel from the mechanical brake device 20 during usual braking operation, viz., if no skidding is being invited or about to be invited between the road wheel of the vehicle and a surface of a road on which the vehicle is running. When, however, skid is about to take place between the road wheel and the road surface during braking, the electric control device responds to the impending skid condition and delivers a control signal to the actuator unit 18 so that the braking fluid pressure in the actuator unit 18 is reduced and accordingly the road wheel is released from the braking force imparted thereto from the mechanical brake device 20. The braking force is in this manner applied to and released from the road wheel several times a second until the skidding tendency is eliminated and the vehicle is brought to a full stop.

The electric brake control device thus operative to control the hydraulic actuator unit 18 comprises a vehicle speed sensor 22 which is adapted to detect a crusing speed $Vv$ of the vehicle and produce an output voltage $Ev$ proportional to the detected vehicle speed $Vv$ and a wheel speed sensor 24 which is adapted to detect a circumferential speed $Vw$ of rotation of the road wheel associated with the mechanical brake device 20 and produce an output voltage $Ew$ which is proportional to the detected wheel speed $Vw$. The output voltages $Ev$ and $Ew$ thus delivered from the vehicle speed sensor 22 and the wheel speed sensor 24, respectively, are fed to input terminals of a voltage divider circuit 26 which is adapted to electrically divide the voltage $Ew$ by the voltage $Ev$ and produce an output voltage proportional to $Ew/Ev$, viz., to a ratio of the detected wheel speed $Vw$ vs. the detected vehicle speed $Vv$. The output voltage $Ew/Ev$ of the voltage divider circuit 26 is fed to a comparator 28 and is therein compared with a predetermined reference voltage $Er$. The comparator 28 is designed to produce digital signal S when the voltage $Ew/Ev$ is lower than the reference voltage $Er$, viz., when the following relation is achieved:

$$(Ev - Ew)/Ev > 1 - Er \qquad (1)$$

so that the slip ratio $R = (Vv - Vw)/Vv$ is larger than $1-\rho$, wherein $\rho$ is a constant corresponding to the reference voltage $Er$.

The digital signal S thus delivered from the comparator 28 is amplified by an amplifier 30 and is supplied therefrom to an input terminal of an electrically operated control means (not shown) forming part of the hydraulic actuator unit 18 so that the braking force applied by the mechanical brake device 20 to the road wheel is lessened to eliminate an impending skid condition as previously noted.

When, in more detail, the brake pedal 12 is rapidly depressed by a vehicle driver during cruising of the vehicle, then the brake fluid pressure developed in the master cylinder 10 is passed to the hydraulic actuator unit 18 through the fluid line 16 so that the mechanical brake device 20 is actuated to apply a braking force to the road wheel with which the brake device 20 is associated. The vehicle speed $Vv$ and the wheel speed $Vw$ and accordingly the output voltages $Ev$ and $Ew$ produced by the vehicle speed sensor 22 and the wheel speed sensor 24, respectively, are consequently reduced at high rates as will be seen from curves $a$ and $b$ indicative of waveforms of the voltages $Ev$ and $Ew$, respectively, in the diagram of FIG. 2A in which point P indicates an instant at which the brake pedal 12 is initially depressed by the vehicle driver. If, in this instance, the reference voltage $Er$ impressed on the comparator 28 is selected to be in correspondence with a slip ratio R of 0.2, then the comparator 28 will produce the digital control signal S when $\rho = Vw/Vv$ is smaller than 0.8 or, in other words, the wheel speed $Vw$ is smaller than a value $0.8 \cdot Vv$. The value $0.8 \cdot Vv$ is thus herein assumed to be a lower limit of the permissible range of the wheel speed $Vw$. In the diagram of FIG. 2A, curve $c$ indicates a voltage corresponding to $0.8 \cdot Ev$. Thus, the comparator 28 does not deliver the control signal S and accordingly the braking force applied to the road wheel is not lessened by means of the control device when the voltage $Ew$ representative of the wheel speed $Vw$ is higher than the voltage $0.8 \cdot Vv$ but, for durations in which the voltage $Ew$ is lower than the voltage $0.8 \cdot Ev$, the digital control signal S is produced from the comparator 28 as indicated in FIG. 2B so that the braking pressure applied to the road wheel is lessened by means of the hydraulic actuator unit 18 operated by the control signal S. The braking pressure, denoted by $Fp$, is in this manner varied in a pulsating form until the vehicle is brought to a full stop as indicated by a waveform $f$ shown in FIG. 2C.

The braking force $Fp$ would thus be reduced when the slip ratio R is about to increase beyond the predetermined value of 0.2 with result that the slip ratio R could be limited below 0.2 by means of the brake control device shown in FIG. 1 so that the skidding of the vehicle could be prevented and the driver's directional control over the vehicle could be maintained throughout the braking operation. Actually, however, there is usually a time delay between an instant at which the control signal S is fed to the actuator unit 18 and an instant at which the actuator unit 18 is initiated into action after the control signal has been applied to the unit, as previously pointed out briefly. As will be seen from FIGS. 2A, 2B and 2C, the control signal S is first delivered at point B after the brake pedal has been depressed as at point A because the voltage Ew becomes lower than the voltage 0.8·Ev at the point B at which curves $a$ and $c$ meet each other. Due to the delay time inherent in the actuator unit 18, however, the braking force Fp exerted on the road wheel of the vehicle by the mechanical brake device 20 is caused to drip in drop $T_1$ after the control signal S is issued from the comparator 28. Likewise, the braking force Fp is caused to rise in a subsequent cycle in a time $T_2$ after the control signal S from the comparator unit 28 has disappeared at point C at which the voltage Ew becomes higher than the voltage 0.8·Ev. By reason of the delay times $T_1$ and $T_2$ thus concomitant with the operation of the actuator unit 18, the electric brake control device of the nature thus far described has been unable to control the braking fluid pressure in such a manner to maintain the wheel speed Vw higher than the permissible lower level of, for example, 0.8·Vv throughout the braking period, thus failing to provide full assurance of minimizing the stopping distance of the vehicle and maintaining the driver's directional control over the vehicle during braking.

FIG. 3 roughly illustrates a general relation between the previously defined slip ratio R and the coefficient of friction $\mu$ between a tire of a road wheel and a surface of a road on which a vehicle runs. Curved segment between points $P_1$ and $P_2$ on the curve shown in FIG. 3 indicates a region in which the wheel speed Vw is made higher than a value 0.8·Vv due to the delay time $T_2$ of the actuator unit 18. During the region between point $P_1$ and $P_2$, the coefficient of friction $\mu$ between the wheel tire and the road surface is in a range of from $\mu_1$ to $\mu_2$ and is thus lower than a maximum value $\mu_3$ of the friction coefficient as achieved at point $P_3$ on the characteristic curve. Since, thus, the coefficient of friction coming into play when the road wheel is being braked upon by the mechanical brake device 20 is considerably short of the highest available value, the stopping distance of the vehicle tends to be prolonged due to the delay time involved in the operation of the actuator unit 18.

Figure 4:
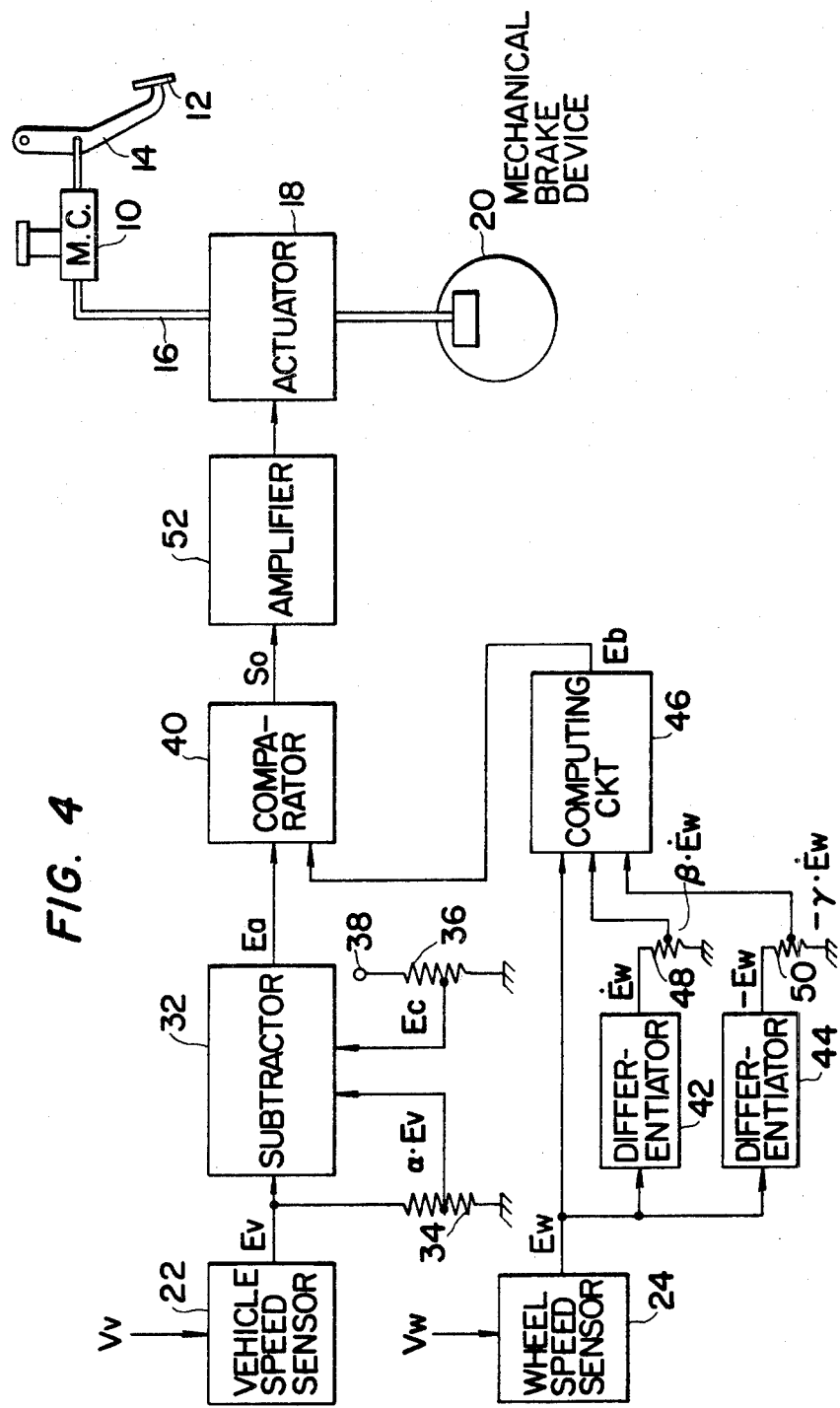
FIG. 4 is a block diagram which illustrates a preferred embodiment of the electric brake control device according to the present invention.

The goal of the present invention is to eliminate the drawbacks thus inherent in the prior art electric brake control device of the nature thus far described and is accordingly to compensate for the delay times $T_1$ and $T_2$ of the actuator unit 18 by means of a control circuit having a simple construction. FIG. 4 illustrates a preferred embodiment of the electric brake control device which is adapted to achieve this goal.

In FIG. 1, the parts and unit having their counterparts in the arrangement shown in FIG. 1 are designated by like reference numerals. The hydraulic brake system to incorporate the electric brake control device embodying the present invention is thus shown to include a master cylinder 10, a brake pedal 12 operatively connected to the master cylinder 10 through a mechanical linkage 14, a hydraulic actuator unit 18 which is in communication with the master cylinder 10 through a fluid line 16 and which is assumed to include a wheel cylinder, and a mechanical brake device 20 to be actuated by the actuator unit 18. As previously mentioned, the mechanical brake device may be of the drum type or the disc type and is capable of applying a braking force to an associated road wheel (not shown) of the vehicle when actuated by the wheel cylinder forming part of the hydraulic actuator unit 18. The master cylinder 10 may be of the single or tandem type. Only one mechanical brake device 20 is herein shown and accordingly it is assumed that only one of the road wheels of the vehicle is to be controlled by the brake control device, such is merely for the sake of simplicity of illustration and, therefore, the electric brake control device according to the present invention may be arranged to be operable on two or more of the road wheels of the vehicle if the number of component elements making up the electric circuitry of the control device is appropriately increased in accordance with a desired number of road wheels to be controlled.

The hydraulic actuator unit 18 has incorporated therein an electrically actuated skid control means operable to reduce the braking force to be applied to the road wheel from the mechanical brake device 20. When kept de-energized, the skid control means remains inoperative so that the braking fluid pressure delivered from the master cylinder 10 is permitted to act on the mechanical brake device 20 during usual braking, viz., in the absence of a skidding condition. When, however, an impending skid is detected by the brake control device to be described, the skid control means is energized to reduce the braking fluid pressure in the actuator unit 18 and accordingly to prevent the road wheel from being locked up during braking.

The electric brake control device embodying the present invention includes a vehicle speed sensor 22 and a wheel speed sensor 24 similarly to the prior art brake control device illustrated in FIG. 1. As previously mentioned with reference to FIG. 1, the vehicle speed sensor 22 is adapted to detect a cruising speed Vv of the vehicle and produce an output voltage Ev proportional to the detected vehicle speed Vv whereas the wheel speed sensor 24 is operative to detect a circumferential speed Vw of rotation of the road wheel and produce an output voltage Ew which is proportional to the detected wheel speed Vw. The vehicle speed sensor 22 may be constituted by an alternating current generator mounted on and driven by a road wheel which is independent of the usual front and rear road wheels or a Doppler radar for automotive uses.

The vehicle speed sensor 22 has an output terminal connected to computing means which include a subtractor circuit 32 having first, second and third input terminals 32a, 32b and 32c, respectively. The first input terminal 32a of the subtractor circuit 32 is connected direct to the output terminal of the vehicle speed sensor 22. The second input terminal 32b of the subtractor circuit 32 is connected through a first voltage dividing resistor 34 to the output terminal of the vehicle speed sensor 22 whereas the third input terminal 32c of the subtractor circuit 32 is connected through a second voltage dividing resistor 36 to a terminal 38 on which a constant voltage is impressed. The first voltage dividing resistor 34 is so arranged as to produce a voltage $\alpha \cdot Ev$ (wherein $\alpha$ is a constant which is smaller than 1) between the second input terminal 32b of the subtractor 32 and the output terminal of the vehicle speed sensor 22 whilst the second voltage dividing resistor 36 is so set as to produce a constant voltage E$c$ between the third input terminal 32$c$ of the subtractor circuit 32 and the terminal 38 of a constant voltage source (not shown). The voltage $\alpha$·E$v$ thus impressed on the second input terminal 32$b$ of the subtractor circuit 32 is proportional to and smaller than the voltage E$v$ delivered from the output terminal of the vehicle speed sensor 22. The subtractor circuit 32 thus supplied with the voltages E$v$, $\alpha$·E$v$ and E$c$ is operative to electrically subtract the voltage $\alpha$·E$v$ and E$c$ from the voltage E$v$ and thus produce an output voltage E$a$ which is equal to E$v$ − ($\alpha$·E$v$ + E$c$), the value of the term in the parenthesis being a function of the voltage E$v$ and thus varying with the vehicle speed V$v$ detected by the vehicle speed sensor 22.

The subtractor circuit 32 has an output terminal connected to one input terminal of a comparator 40 which has another input terminal connected to an output terminal of the wheel speed sensor 24. The comparator 40 is thus operative to compare the output voltage E$a$ from the subtractor circuit 32 with the output voltage E$w$ from the wheel speed sensor 24 and produce a first control signal S$_1$ of logical 1 when the voltage E$a$ is higher than the voltage E$w$, viz., when the following relation is established:

$$\text{E}v - \alpha\cdot\text{E}v - \text{E}c > \text{E}w. \tag{2}$$

The wheel speed sensor 24 has an output terminal which is connected in parallel to first and second differentiating circuits 42 and 44, respectively. The first differentiating circuit 42 is adapted to be actuated only when the output voltage E$w$ produced from the wheel speed sensor 24 is on the increase, viz., the wheel speed V$w$ is increasing and, conversely, the second differentiating circuit 44 is adapted to be actuated only when the output voltage E$w$ from the wheel speed sensor 24 is on the decrease, viz., the road wheel of the vehicle is being decelerated. When actuated, the first differentiating circuit 42 is operative to electrically differentiate the voltage E$w$ with respect to time and produce an output voltage $\dot{\text{E}}w$ which is proportional to the rate of increase of the wheel speed V$w$, viz., to the degree of acceleration of the road wheel of the vehicle. Likewise, the second differentiating circuit 44 becomes operative, when actuated, to differentiate the voltage E$w$ with respect to time and produce an output voltage −$\dot{\text{E}}w$ which is proportional to the rate of decrease of the wheel speed V$w$, viz., to the degree of deceleration of the road wheel.

A computing circuit 46 has a first input terminal 46$a$ connected to the output terminal of the wheel speed sensor 24, a second input terminal 46$b$ connected through a voltage dividing resistor 48 to an output terminal of the first differentiating circuit 42, and a third input terminal 46$c$ connected through a voltage dividing resistor 50 to an output terminal of the second differentiating circuit 44. The voltage dividing resistor 48 is arranged to produce a voltage $\beta$·$\dot{\text{E}}w$ (wherein $\beta$ is a constant which is smaller than 1) between the output terminal of the first differentiating circuit 42 and the second input terminal 46$b$ of the computing circuit 46, whilst the voltage dividing resistor 50 is set to produce a voltage $\gamma$·$\dot{\text{E}}w$ (wherein $\gamma$ is a constant which is smaller than 1) between the output terminal of the second differentiating circuit 44 and the third input terminal 46$c$ of the computing circuit 46. The computing circuit 46 is thus supplied with the voltage E$w$ proportional to the wheel speed V$w$ and either the voltage $\beta$·$\dot{\text{E}}w$ proportional to the rate of increase of the wheel speed V$w$ if the road wheel is being accelerated or the voltage −$\gamma$·$\dot{\text{E}}w$ proportional to the rate of decrease of the wheel speed V$w$ if the road wheel is being decelerated. The computing circuit 46 is adapted to produce an output voltage E$b$ of E$w$ + $\beta$·$\dot{\text{E}}w$ if the road wheel is being accelerated or E$w$ + $\gamma$·$\dot{\text{E}}w$ (in which instance $\dot{\text{E}}w$ is a negative value). In view of the fact that the first and second differentiating circuits 42 and 44 could not become operative simultaneously, the output voltage E$b$ delivered from the computing circuit 46 can be written in the form of:

$$\text{E}b = \text{E}w + \beta\cdot\dot{\text{E}}w + \gamma\cdot\dot{\text{E}}w.$$

When, thus, the first differentiating circuit 42 is operative, the voltage E$b$ is higher than the voltage E$w$ and, when the second differentiating circuit 44 is operative, the voltage E$b$ is lower than the voltage E$w$.

The computing circuit 46 has an output terminal connected to another input terminal of the previously mentioned comparator 40. The comparator 40 is thus operative to compare the voltages E$a$ and E$b$ with each other and produces a control signal S$o$ in the form of logical 1 when the voltage E$a$ is higher than the voltage V$b$, viz., when the following relation is established:

$$\text{E}a = \text{E}v - (\alpha\cdot\text{E}v + \text{E}c) > \text{E}w + \beta\cdot\dot{\text{E}}w + \gamma\cdot\dot{\text{E}}w = \text{E}d. \tag{3}$$

The control signal S$o$ thus delivered from the comparator 40 is supplied through an amplifier 52 to an input terminal of the skid control means incorporated into the hydraulic actuator unit 18 for reducing the braking fluid pressure in the actuator unit.

The voltages E$v$, E$w$, E$a$ and E$b$ thus produced in the brake control device constructed and arranged in an above described manner are indicated by curves $a$, $b$, $c$ and $d$, respectively, in FIG. 5A. The control signal S$o$ of logical 1 is produced from the control device as indicated by a waveform $e$ in FIG. 5B when the voltage V$a$ is higher than the voltage V$b$ as will be seen from the curves $c$ and $d$ in FIG. 5A. FIG. 5C illustrates a curve $\phi$ which is indicative of the braking force F$i$ which is applied to the road wheel from the mechanical brake device 20 (FIG. 4) under the control of the control signal delivered from the brake control device.

The operation of the electric brake control device which is constructed and arranged in the manners thus far set forth will now be described with reference to FIGS. 4 and 5A to 5C.

When the brake pedal 12 is rapidly depressed by a vehicle driver at time $t_o$ (FIG. 5A) during cruising of the vehicle, an increased fluid pressure is developed in the master cylinder 10 so that an increasing braking force F$i$ is applied to the road wheel from the mechanical brake device 20. Brakes are thus applied to the road wheels of the vehicle so that the vehicle speed V$v$ and the wheel speed V$w$ decrease as the time lapses from point $t_o$. As a consequence, the voltages E$v$ and E$w$ representative of the vehicle and wheel speeds, respectively, drop as indicated by curves $a$ and $b$ in FIG. 5A. Due to the drop of the voltage E$v$, the voltage E$a$ produced from the subtractor circuit 32 also decreases as indicated by curve $c$ in FIG. 5A. At an incipient stage of the braking operation, the road wheel is being decelerated by the braking force $Fi$ applied thereto from the mechanical brake device 20 so that the first differentiating circuit 42 is held inoperative and the second differentiating circuit 44 is operative to produce an output voltage $-\dot{E}w$ which is representative of the rate of decrease of the wheel speed $Ew$. The computing circuit 46 therefore produces an output voltage $Eb = Ew + \gamma \cdot \dot{E}w$ (which is lower than the voltage $Ew$ as will be seen from curves $b$ and $d$ in FIG. 5A) in the absence of an input voltage at its second input terminal connected to the first differentiating circuit 42. The voltage $Eb$ thus delivered from the computing circuit 46 is compared with the voltage $Va$ from the subtractor circuit 32 by the comparator 40. When, under these conditions, the voltage $Vb$ becomes lower than the voltage $Va$ as at time $t_1$ (FIG. 5A), then the comparator 40 produces the control signal $So$ of logical 1. The control signal $So$ is amplified by the amplifier 52 and is thereafter fed to an input terminal of the electrically operated skid control means of the hydraulic actuator unit 18 whereby the braking force $Fi$ applied to the road wheel of the vehicle from the mechanical brake device 20 is reduced as will be seen from curve $\phi$ of FIG. 5C. As a consequence, the road wheel associated with the mechanical brake device 20 is permitted to turn at an increasing speed as will be seen from the curve $b$ shown in FIG. 5A. At the moment the road wheel is thus accelerated, the second differentiating circuit 48 is rendered inoperative and, in turn, the first differentiating circuit 42 becomes operative to produce an output voltage $\dot{E}w$ which is proportional to the rate of increase of the wheel speed $Vw$. The computing circuit 46 therefore produces an output voltage $Eb = Ew + \beta \cdot \dot{E}w$. The voltage $Eb$ thus produced from the computing circuit 46 is lower than the voltage $Ea$ until time $t_2$ (FIG. 5A) so that the comparator 40 continues to produce the control signal $So$ until time $t_2$. When, the voltage $Eb$ turns higher than the voltage $Ea$ at time $t_2$, the comparator 40 ceases to produce the control signal $So$ of logical 1 and produces a signal of logical 0. The skid control means incorporated into the actuator unit 18 is accordingly de-energized so that an increasing braking force $Fi$ is applied to the road wheel from the mechanical brake device 20 as will be seen from the curve $\phi$ of FIG. 5C. The road wheel is in this manner decelerated for a second time by the increasing braking force and, when the voltage $Eb$ resulting from the voltage $Ew$ from the wheel speed sensor 24 and the voltage $-\dot{E}w$ from the second differentiating circuit 44 becomes for a second time lower than the voltage $Ea$ from the subtractor circuit 32, the comparator 40 produces the control signal $So$ of logical 1 so that the skid control means of the hydraulic actuator unit 18 is energized and accordingly the braking force applied to the road wheel from the mechanical brake device 20 is diminished to permit the road wheel to turn at an increasing speed.

The braking actions on the road wheel is thus monitored by the hydraulic actuator unit 18 under the control of the control signal $So$ delivered from the electric brake control device thus far described. As previously pointed out, an appreciable amount of delay time is caused between a time at which the actuator unit 18 receives the control signal of logical 1 or 0 from the electric brake control device and a time at which the mechanical brake device 20 is initiated into action by the actuator unit 18. When, for example, the hydraulic actuator unit 18 is supplied with the control signal of logical 1, the actuator unit 18 becomes effective to lessen the braking force in a time $T_1$ after the control signal has been applied to the actuator unit 18. When, conversely, the hydraulic actuator unit 18 is supplied with the control signal of logical 0, the actuator unit 18 becomes effective to increase the braking force in a time $T_2$ after the control signal has been applied to the actuator unit 18, as previously described with reference to FIG. 2C. This is because of the face that, in the prior art electric brake control device illustrated in FIG. 1, the control signal of logical 1 to reduce the braking force is issued at a point in the vicinity of the time $t_3$ (FIG. 5A) at which the voltage $Ew$ representative of the wheel speed $Vw$ turns lower than the voltage $Ea$ varying with the vehicle speed $Vv$ and the control signal of logical 0 is issued at a point in the vicinity of time $t_4$ (FIG. 5A) at which the voltage $Ew$ for a second time becomes higher than the voltage $Ea$. In the electric brake control device embodying the present invention, however, the control signal of logical 1 to reduce the braking force is issued at time $t_1$ (FIG. 5A) at which the voltage $Eb$ which is related to the wheel speed $Vw$ turns lower than the voltage $Ea$ varying with the vehicle speed $Vv$ whilst the control signal of logical 0 to increase the braking force is issued earlier at time $t_2$ (FIG. 5A) at which the voltage $Eb$ related to the rate of increase of the wheel speed $Vw$ becomes higher than the voltage $Ea$. Thus, the control signal of logical 1 to reduce the braking force is applied to the hydraulic actuator unit 18 at a timing which is earlier by time period of $T_1$ than the timing at which such a signal is applied to the actuator unit by the prior art control devices and the control signal of logical 0 is applied to the actuator unit 18 at a timing which is earlier by a time period of $T_2$ than the timing at which such a signal is applied to the actuator unit. The delay times $T_1$ and $T_2$ involved in the operation of the actuator unit are, in this manner, compensated for by the electric control device according to the present invention and, by virtue of this, the braking operation can be performed in sufficiently stable conditions and the fluctuations of the wheel speed can be reduced to a minimum.

Since, moreover, the voltage $Va$ produced from the subtractor circuit 32 forming part of the computing means in the brake control device embodying the present invention is kept appropriately lower than the voltage $Vv$ representative of the vehicle speed $Vv$, the voltage $Ew$ is kept sufficiently lower than the voltage $Ev$ and accordingly the wheel speed $Vw$ is prevented from closely approaching the vehicle speed $Vv$ during braking in spite of the delay involved in the operation of the actuator unit, as will be understood from comparison between the curves $a$ and $b$ in FIG. 5A. This is an important feature of the control device according to the present invention because the coefficient of friction available between the tire of the road wheel and the surface of the road is in the vicinity of its peak (indicated by $\mu_3$ in the graph of FIG. 3) and, accordingly, the braking on the vehicle can be effected at an increased efficiency.

What is claimed is:

1. An electric control device for an automotive brake system having skid control means, comprising a vehicle speed sensor for detecting a speed of an automotive vehicle and producing an output voltage proportional to the detected vehicle speed, a wheel speed sensor for detecting a circumferential speed of rotation of a road wheel of the vehicle and producing an output voltage which is proportional to the detected wheel speed, first computing means for subtracting from the output voltage of the vehicle speed sensor a first variable reference voltage related to the output voltage of the vehicle speed sensor, first differentiating means for differentiating the output voltage of the wheel speed sensor with respect to time and producing an output voltage proportional to a rate of increase of the output voltage of the wheel speed sensor, second differentiating means for differentiating the output voltage of the wheel speed sensor with respect to time and producing an output voltage proportional to a rate of decrease of the output signal of the wheel speed sensor, second computing means for adding to the output signal of the wheel speed sensor a second variable reference voltage proportional to the output voltage from the first differentiating means and substracting from the output voltage of the wheel speed sensor a third variable reference voltage proportional to the output voltage from the second differentiating means, and comparing means for comparing the output voltages from the first and second computing means with each other and producing a digital signal when the output voltage from the first computing means is higher than the output voltage from the second computing means whereby a braking force applied to the road wheel is lessened in response to the digital signal.

2. An electric control device as claimed in claim 1, in which said first computing means comprises a subtractor circuit having a first input terminal connected to an output terminal of said vehicle speed sensor, a second input terminal connected through a first voltage divider to the output terminal of the vehicle speed sensor, and a third input terminal connected through a second voltage divider to a constant voltage source so that said first variable reference voltage equals a difference between the output voltage from the vehicle speed sensor and a sum of voltages applied to the second and third input terminals of the subtractor circuit.

3. An electric control device as claimed in claim 1, in which said second computing means has a first input terminal connect to an output terminal of said wheel speed sensor, a second input terminal connected to an output terminal of said first differentiating means through a first voltage divider producing said second variable reference voltage, and a third input terminal connected to an output terminal of said second differentiating means through a second voltage divider producing said third variable reference voltage.

* * * * *